June 28, 1966   K. E. BUCKMAN ETAL   3,258,122
FILTERS FOR LIQUIDS
Filed March 18, 1963
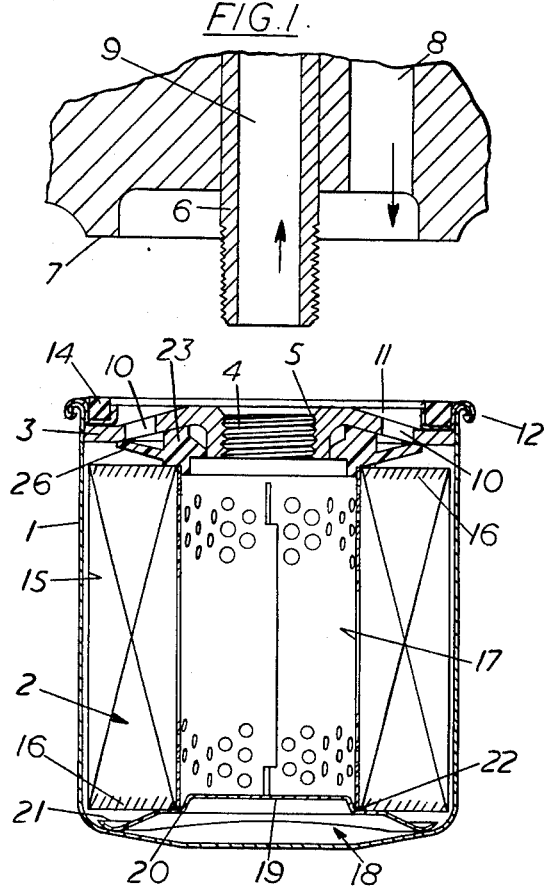
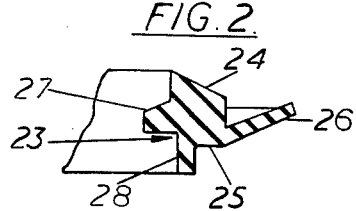
INVENTORS
*Kenneth Ernest Buckman &
Stanley Thomas Morris*
BY
*George E. Johnson*
Attorney

United States Patent Office 3,258,122
Patented June 28, 1966

3,258,122
FILTERS FOR LIQUIDS
Kenneth Ernest Buckman, Winsor, near Woodlands, and Stanley Thomas Morris, Hythe, England, assignors to General Motors Corporation, Detroit, Mich., a corporation of Delaware
Filed Mar. 18, 1963, Ser. No. 265,893
Claims priority, application Great Britain, Mar. 23, 1962, 11,150/62
1 Claim. (Cl. 210—136)

This invention relates to filters for liquids and in particular to oil filters for internal combustion engines; the invention is especially applicable to so called "screw-on throw-away" oil filters in which a filter element is housed in a thin sheet metal casing having an end plate with a threaded portion adapted to be engaged with a complementary threaded portion of a mounting for the filter, the whole filter unit being discarded and replaced by a new unit when the filter element has become blocked.

In a liquid filter according to the invention opposite sides of an annular filter element are placed in communication with inlet and outlet openings at one end of the filter casing by means of a seal member which also constitutes a non-return valve.

The seal member is preferably an annular member of synthetic rubber or like material opposite end faces of which respectively engage an end wall of the casing about an outlet opening therein, and one end of the element about the central passage therethrough, the seal member having an integral outwardly extending annular flange arranged so as normally to overlie and close one or more inlet openings in said end wall. When the filter is in use the pressure of the liquid delivered to the filter through the inlet openings resiliently deflects the flange, but when the filter is not in use the flange overlies the inlet openings to prevent liquid draining back from the inlet side of the filter.

Preferably the seal member is externally stepped at one end to form a tubular extension adjacent an annular shoulder. The tubular extension fits within the central opening in the filter element at one end thereof; and the said end of the filter element abuts, at its inner peripheral portion, against the said annular shoulder.

The annular shoulder may be additionally sealed to the inner peripheral portion of the element by means of an adhesive.

The scope of the invention is defined by the appended claims; and the invention and the method by which it is to be performed are hereinafter particularly described with reference to the accompanying drawing in which:

FIGURE 1 is a vertical section through a filter according to the invention and of a mount face on which the filter is to be mounted; and FIGURE 2 is a detail of a seal member shown in FIGURE 1.

FIGURE 1 shows an oil filter comprising a filter shell or casing 1 within which is an annular pleated paper filter element 2. The casing 1 is of cup-shape and made of thin sheet metal and at its open end there is secured a circular end plate 3 of thicker gauge metal having a central opening 4 in an integral neck 5 which is internally threaded and extends within the casing 1, the internally threaded neck 5 being adapted to be engaged with a complementary threaded spigot 6 on an internal combustion engine mount face 7 having a filter inlet passage 8 opening at said face, the spigot having an outlet passage 9 therein. Around the central opening 4 in the end plate 3, which constitutes the outlet from the filter casing 1 is a circular series of openings 10 which constitute the inlet to the filter casing.

The end plate 3 is secured to the open end of the casing 1 by means of an annular disc 11 of thin sheet metal which is spot welded or otherwise secured coaxially with the end plate 3. The outer peripheral portion of the thin sheet metal 11 initially extends radially beyond the outer periphery of the end plate 3 and is secured to the end of the casing 1 by means of a rolled seam joint 12, the end plate 3 thereby being axially offset, towards the base of the casing 1, from the rolled seam joint 12.

The inner portion of the annular disc of sheet metal 11 is turned over to form, adjacent the rolled seam joint 12, an annular trough in which is secured, as by adhesive, an annular gasket 14 of rubber or like material.

The annular filter element 2 is made of a strip of synthetic resin-impregnated filter paper or like material folded to form a series of pleats 15 in which the fold lines extend longitudinally of the annulus; the pleats are preferably each sealed at opposite ends thereof separately from adjacent pleats, as by adhesive 16 between the opposing end portions of each pleat. Thus, as shown in the drawing, the filter element does not need to be provided with annular end caps sealed to each end of the element, such as are commonly employed in pleated filter elements.

The filter element 2 is mounted on a central perforate support tube 17 and the upper end of the element is pressed towards the end plate 3 by means of a spring plate 18 interposed between the lower end of the element and the base of the casing 1, the plate 18 having a central circular dished portion 19 to form an annular shoulder 20 which fits within the lower end of the support tube 17 to form a seal therewith and with the adjacent inner peripheral portion of the lower end of the element. The plate 18 has two or more integral radial spring arms 21 the ends of which engage the base of the filter casing 1 so as to press the element 2 towards the upper end of the casing 1. The joint between the shoulder 20 on the spring plate 18 and the lower end of the element 2 may be additionally sealed by means of a fillet 22 of adhesive therebetween.

The upper end of the filter element 2 is sealed to the end plate 3 by means of an annular seal member 23 which also constitutes a non-return valve. The annular seal member 23 is made of synthetic rubber or the like material and has opposite end faces 24, 25 which respectively engage the end plate 3 about the neck 5 thereof and the upper end of the element 2 about the central passage within the support tube 17, the seal member 23 also having an integral outwardly extending annular flange 26 arranged so as normally to overlie and close the inlet passages 10 in the end plate 3. Preferably the seal member 23 has an inner radial flange 27 by which it is located coaxially on the neck 5 of the end plate 3.

The pressure of the spring plate 19 maintains the opposite faces 24, 25 of the seal member 23 in engagement respectively with the end plate 3 and the inner peripheral portion of the upper end of the filter element 2.

Preferably the seal member 23 is externally stepped at one end to form a tubular extension 28 the outer peripheral surface of which forms with the face 25 an annular shoulder. The tubular extension 28 fits within the central opening in the upper end of the filter element 2; and the upper end of the filter element abuts, at its inner peripheral portion, against the said annular shoulder. The seal between the shoulder and the filter element 2 may be additionally secured by means of adhesive.

The filter described above forms a unit which is intended to be discarded after use, the filter being readily screwed on to or unscrewed from the spigot 6 in the mount face 7.

In use, the attachment of the filter neck 5 to the spigot 6 brings the gasket 14 into sealing abutment with the mount face 7; and the opposite sides of the filter element 2 are placed in communication with the inlet and outlet openings 8, 9 by means of the seal member 23. When no oil is being delivered to the filter through the passage 8 the flange 26 overlies and seals the inlet openings 10 of the filter; but when oil is delivered through the passage 8 the pressure of the oil deflects the flange 26 to allow the liquid to pass to the exterior of the filter element 2 and then, after passing through the element, to be discharged therefrom through the central passage within the support tube 17 and from thence to the outlet passage 9.

When the filter is removed from the mount face for replacement by a new unit, the flange 26 will overlie the inlet openings 10 in the end plate 3 and thereby prevent oil draining out through these openings. Similarly during the use of the filter the flange prevents the drainage back into the oil circulation system of unfiltered oil. Thus, the seal member 23 acts not only as a seal between the inlet and outlet sides of the filter, but also as a non-return valve.

It will be understood that the invention is applicable to other forms of filter than that described above; for example, the end plate 3 could have an external spigot thereon adapted to be screwed into a tapped bore in a mount face for the filter.

We claim:

A liquid filter comprising an annular filter element having cylindrical walls, a thin-walled casing in the form of a cup, a thick end wall cooperating with said casing to enclose said element, an outlet neck on said end wall, an inlet opening in said end wall, said element and neck being coaxial, an annular sealing member of elastomeric material having a thick hub portion surrounding said neck, annular surfaces on said sealing member contacting said end wall and neck to form annular seals, an annular extension on said sealing member telescopically engaging one end of said filter element, a thin annular flange integral with said sealing member extending across said inlet opening toward said end wall, the periphery of said annular flange being in resilient engagement with said end wall, and means closing the other end of said filter element to limit flow between said inlet opening as controlled by said flange and said outlet neck to a path leading through said cylindrical walls.

References Cited by the Examiner

UNITED STATES PATENTS

| | | | |
|---|---|---|---|
| 2,542,254 | 2/1951 | Lamb | 210—136 X |
| 2,546,213 | 3/1951 | Clemmons | 137—512.15 |
| 2,731,154 | 1/1956 | Burnell | 210—130 X |
| 2,734,636 | 2/1956 | Foster | 210—130 |
| 2,877,902 | 3/1959 | Chase et al. | |
| 2,888,141 | 5/1959 | Coates et al. | 210—136 X |
| 2,995,249 | 8/1961 | Boewe et al. | |
| 2,995,250 | 8/1961 | Boewe et al. | 210—130 |
| 3,036,711 | 5/1962 | Wilhelm | 210—130 |
| 3,061,101 | 10/1962 | Humbert | 210—130 |
| 3,132,097 | 5/1964 | Tietz | 210—130 |
| 3,166,498 | 1/1965 | Otto | 210—440 X |

REUBEN FRIEDMAN, *Primary Examiner.*

HARRY B. THORNTON, *Examiner.*

F. A. SPEAR, R. A. CATALPA, *Assistant Examiners.*